April 24, 1934.  C. W. SINCLAIR  1,955,980

METHOD OF FORMING BOLTS

Filed Dec. 14, 1931

INVENTOR

Charles W. Sinclair

BY Whittemore Hulbert & Whittemore Belknap.

ATTORNEYS

Patented Apr. 24, 1934

1,955,980

UNITED STATES PATENT OFFICE 1,955,980

METHOD OF FORMING BOLTS

Charles W. Sinclair, Detroit, Mich., assignor to Kelsey-Hayes Wheel Corporation, Detroit, Mich., a corporation of New York Application December 14, 1931, Serial No. 580,978

6 Claims. (Cl. 10—27)

The invention relates to bolts and the method of forming the same and has for an object an improved method of forming a bolt of that type having a fin for holding the bolt from rotation. Another object is to so form the bolt that it may be economically produced. These and other objects of the invention will become apparent from the following description, taken in connection with the accompanying drawing, in which Figure 1 is a central section through a wheel having a bolt showing an embodiment of my invention;

The bolt illustrated in the present instance is designed particularly for use in detachably securing a demountable wheel body to an inner hub. This bolt is known as a countersunk head screw, its head having a tapered face for engaging a tapered seat on the inner hub and its shank being threaded for engagement with a nut, which also preferably has a tapered face for engaging a tapered seat on the wheel body, the arrangement providing for proper seating of the parts without bending the bolt. This bolt is also provided with one or more fins, there preferably being two, for engaging the inner hub and holding the bolt from rotation during the turning of the nut.

Figure 1:
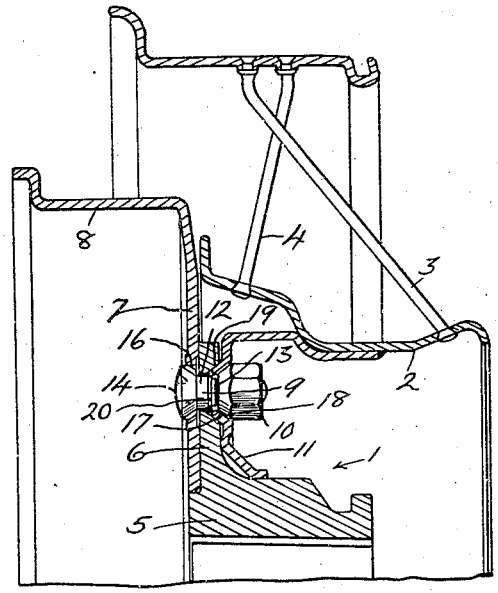
Figure 2:
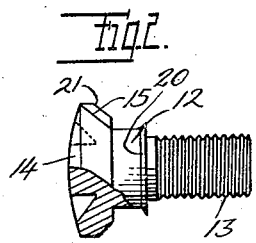
Figure 2 is an enlarged side elevation of the bolts shown in Figure 1.
Figure 3:
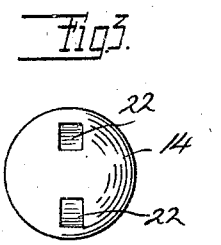
Figures 3 and 4 are opposite end views thereof.
Figure 4:
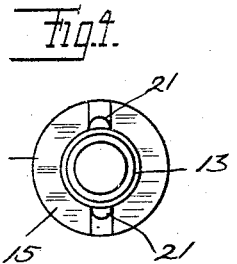

As illustrated in Figure 1, 1 is the demountable wheel body having the outer hub 2 and the front and rear series of wire spokes 3 and 4, respectively, extending from the outer hub to the rim member. 5 is the inner hub having the fixed radial flange 6 to which is secured the web 7 of the brake drum 8. The outer hub is detachably secured to the inner hub by the annular series of bolts 9 and the nuts 10 threaded upon these bolts. The bolts extend through the web 7, the fixed flange 6 and the anchoring or mounting portion 11 of the outer hub and sufficient clearance is provided through the openings to permit the bolts to move angularly. Each bolt comprises the shank 12 having the threaded portion 13 and the head 14 at the rear end of the shank. This head has its inner face 15, which is adjacent to the shank, tapered toward the shank and this tapered face engages the correspondingly tapered countersunk seat 16 in the web 7. Each nut 10 is internally threaded to engage a threaded portion 13 of a bolt and has the tapered face 17 which is engageable with a correspondingly tapered seat 18 formed in a rearward depression 19 of the anchoring or mounting portion 11. Each bolt is preferably held from accidental disengagement from the inner hub by means of the peripheral fin 20 formed upon the shank by a staking operation. Also each bolt is held from rotation when turning the nut by means of the longitudinally extending and diametrically opposite fins 21 formed upon the inner tapered face 15 of the bolt head.

In forming the bolt, the bolt blank having the shank 12 and the head 14 is first provided, the head being preferably formed hot. This head is formed with the tapered inner face 15. The fins 21 are preferably formed by a punching operation, during which a punch is moved longitudinally of a bolt blank and parallel to its axis and toward its shank and pierces the head at 22. This punch deflects the metal at these points longitudinally and laterally into a die to form the fins 21 on the tapered or frusto-conical inner face of the bolt head and the die is preferably shaped to round the edges of the fins to thereby facilitate angular movement of the bolt. The threading operation upon the bolt shank may be performed either before or after the displacing of the metal of the head to form the fins.

Figure 5:
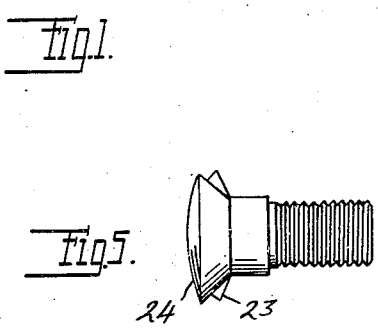
Figure 5 is a side elevation of another bolt embodying my invention.
Figure 6:
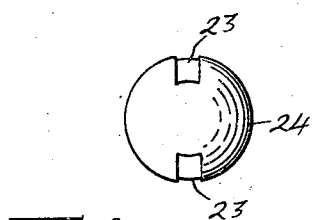
Figures 6 and 7 are opposite end views thereof.
Figure 7:
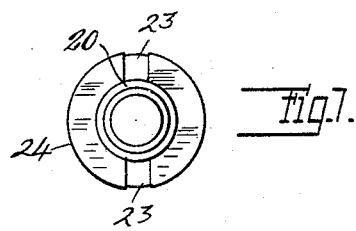

As shown in Figures 5, 6 and 7, the fins 23 and the method of forming the same differs. These fins progressively increase in depth from the shank and are formed by a punch which is movable longitudinally of the bolt blank and substantially parallel to its axis and toward its shank. The punch, however, engages the diametrically opposite outer or peripheral portions of the bolt-head 24 and displaces the metal at these points into a suitable die to form the fins.

It will be seen that either of the bolts above described may be economically formed by reason of separately forming the bolt blanks with their shanks and heads and thereafter displacing the metal of the bolt heads to form the fins for holding the bolts from rotation. With this method the bolts may be formed within the desired manufacturing limits and without excessive maintenance cost of the tools, such as the punches and dies used in their manufacture.

What I claim as my invention is:

1. The method of forming bolts, which comprises forming a bolt blank having a shank and a head with a face tapered toward the shank and extruding a portion of the head in a direction longitudinally of the bolt and toward the shank to form a fin on the tapered face of the head.

2. The method of forming bolts, which comprises providing a bolt blank having a shank and a head at one end of the shank with a face tapered toward the shank, and extruding diametrically opposite portions of the head in a direction longitudinally of the bolt and toward the shank by a punching operation to form diametrically opposite fins on the tapered face of the head.

3. A bolt, comprising a shank having a threaded portion and a head having an inner face tapered toward said shank, and a fin on said face struck out from said head and having rounded edges to facilitate angular movements of the bolt.

4. The method of forming bolts, which consists in providing a bolt blank having a shank and a head, and thereafter forming a fin on the head at the same side thereof as the shank by puncning the head to extrude a portion of the same corresponding in shape to the fin longitudinally of the bolt.

5. The method of forming bolts, which consists in providing a bolt blank having a shank and a head, and thereafter forming a fin on the head at the same side thereof as the shank by placing the head into a die having a recess therein corresponding in shape to the fin and by punching the head to displace a portion of the same into the recess aforesaid in the die.

6. The method of forming bolts, which consists in providing a bolt blank having a shank and a head with a face tapered toward the shank, and thereafter forming a fin on the tapered face of the head by placing the latter face against a die having a recess therein corresponding in shape to the fin and by punching the head in a direction to displace a portion of the same into said recess.

CHARLES W. SINCLAIR.